United States Patent [19]

Morris et al.

[11] Patent Number: 5,234,602

[45] Date of Patent: Aug. 10, 1993

[54] METHOD FOR REGENERATING SCALE SOLVENT

[75] Inventors: Richard L. Morris, Duncanville; James M. Paul, DeSoto, both of Tex.

[73] Assignee: Mobil Oil Corporation, Fairfax, Va.

[21] Appl. No.: 593,136

[22] Filed: Oct. 5, 1990

[51] Int. Cl.$^5$ .............................................. B01D 43/00
[52] U.S. Cl. ...................................... 210/698; 210/724
[58] Field of Search ........................ 210/698, 643, 724; 166/312; 134/11, 12; 252/175, 180

[56] References Cited

U.S. PATENT DOCUMENTS 4,973,201  11/1990  Paul et al. ........................ 405/263 X Primary Examiner—Frank Spear
Attorney, Agent, or Firm—Alexander J. McKillop; Charles J. Speciale; Lawrence O. Miller

[57] ABSTRACT

Barium sulfate scale is dissolved by contacting the scale with an aqueous solvent having a pH of about 10 to about 14, preferably about 12, and comprising a chelating agent comprising a polyaminopolycarboxylic acid or salt of such an acid, and a synergist anion. The solvent containing the dissolved scale is regenerated by acidifying the solvent in the presence of an anion which forms a precipitate of an insoluble salt of the alkaline earth metal of the dissolved scale. The precipitate is then removed from the solvent. Thereafter, the pH of the solvent is increased to a pH of about 10 to about 14, preferably about 12, to recover a regenerated solvent for reuse, in dissolving scale.

12 Claims, 2 Drawing Sheets

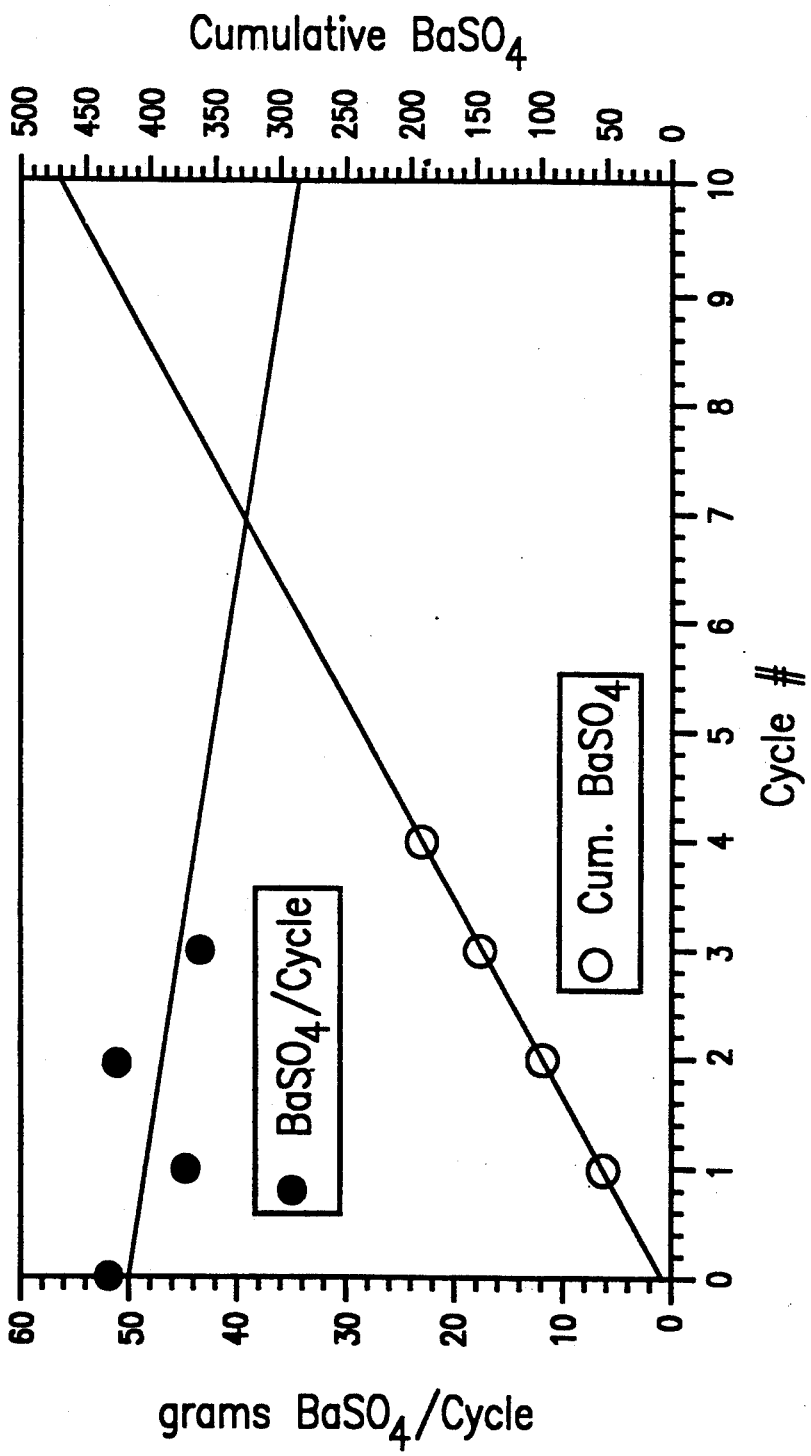

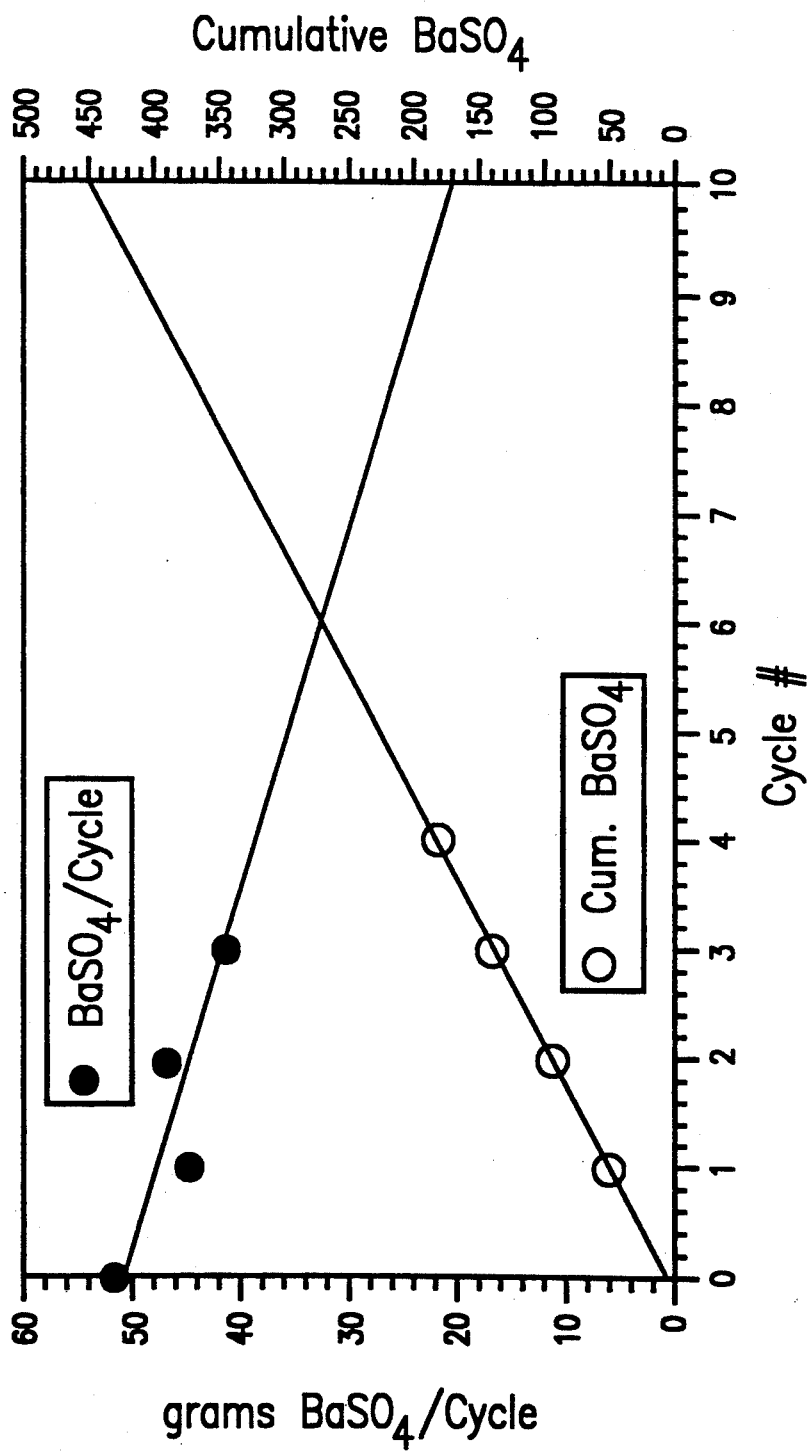

METHOD FOR REGENERATING SCALE SOLVENT

CROSS REFERENCE TO RELATIONS APPLICATIONS

This application is related to prior co-pending applications Ser. No. 07/332,147, filed Apr. 3, 1989, of Jim Paul and R. L. Morris; Ser. No. 07/369,897, filed Jun. 22, 1989, of J. M. Paul and R. L. Morris; Ser. No. 07/431,114, filed Nov. 3, 1989, of J. M. Paul and R. L. Morris; and Ser. No. 07/484,970, filed Feb. 24, 1990, of J. M. Paul and R. L. Morris.

FIELD OF THE INVENTION

This invention relates to solvent compositions which are effective for solubilizing and removing scale, particularly strontium and barium sulfate scale, and naturally occurring radioactive material (NORM), usually containing mainly radium 226 and radium 228, from surfaces with scale deposits on them, the improvement residing in a novel treatment of the solvent to remove the dissolved scale so that the solvent can be regenerated for reuse.

BACKGROUND OF THE INVENTION

Many waters contain alkaline earth metal cations, such as barium, strontium, calcium and magnesium, and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water systems, in production systems for oil and gas, in pulp and paper mill systems, and in other systems, causing delays and shutdowns for cleaning and removal.

In the co-pending applications reference above, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates, or (3) thiosulfates. The scale is removed under alkaline conditions, preferably at pH values of at least 10, usually 10-14, with best results being achieved at about pH 12. When the solvent becomes saturated with scale metal cations, the spent solvent is disposed of by re-injection into the subsurface formation. However, this is an expensive way of disposal and requires a fresh supply of moderately expensive solvent.

This invention provides a method to chemically remove the dissolved scale from the spent solvent through precipitation of the dissolved metal ions.

SUMMARY OF THE INVENTION

In the method for removing alkaline earth sulfate scale by contacting the scale with an aqueous solvent having a pH of about 10 to about 14, preferably about 12, and comprising a chelating agent comprising a polyaminopolycarboxylic acid or salt of such an acid and an anion synergist comprising an oxalate, thiosulfate, nitriloacetate or moncarboxylic acid; the improvement comprising removing alkaline earth sulfate scale dissolved in said solvent by acidifying the solvent in the presence of an anion which forms a precipitate of an insoluble salt of the alkaline earth metal, separating the precipitate from the solvent and increasing the pH of the solvent to a pH of about 10 to about 14, preferably about 12, by the addition of potassium hydroxide to recover a regenerated solvent for reuse to dissolve scale.

The acidification is carried out using mineral acids such as phosphoric acid, sulfuric acid, nitric acid or hydrochloric acid. The use of hydrochloric or nitric acid is preferred because these acids enable residual sulfate ions present in the solvent to be removed as insoluble precipitate formed with the alkaline earth metal cations. Removal of the residual sulfate ions from the solvent is beneficial because these ions are known to inhibit dissolution of alkaline earth sulfate scale by the solvent after the solvent is regenerated.

DESCRIPTION OF THE DRAWINGS

FIG. 1 illustrates a plot of the amount of barium sulfate recovered from the spent solvent per cycle and the cumulative amount of barium sulfate dissolved per cycle wherein each cycle is the result of reducing the pH of the spent solvent from 12 to 6, precipitation of barium sulfate, and then elevating the pH of the solvent to 12.

FIG. 2 illustrates the same plot as FIG. 1 except that each cycle is the result of reducing the pH of the spent solvent from 12 to 7, precipitation of barium sulfate, and then elevating the pH of the solvent to 12.

DESCRIPTION OF THE PREFERRED EMBODIMENT

Alkaline earth metal scales, especially barium sulfate scale deposits are removed from oil field and other tubular goods with a scale-removing solvent comprising a chelating agent and a catalyst or synergist to speed up the dissolution of the scale. The pH of the solvent is maintained at pH values of about 10 to about 14, preferably at about 12, with the addition of potassium hydroxide (caustic potash). Suitable chelating agents comprise polyaminopolycarboxylic acid such as EDTA or DTPA. The catalyst or synergist comprise anions of at least one monocarboxylic acid such as mercaptoacetic acid, aminoacetic acid and hydroxyacetic acid; oxalates, and/or thiosulfates. This invention describes a method for regenerating the solvent containing scale through precipitation of the dissolved metal ions and subsequent upward adjustment of pH to a pH of about 10 to about 14.

The scale solvent effectively removes all the common oil field scales, including sulfates of barium, calcium and strontium, calcium and iron carbonates and naturally occurring radioactive material (NORM), mainly radium 226 and radium 228. The chelating agent in the solvent is capable of binding alkaline earth metal ions tightly at high pH levels. However, if the pH is lowered sufficiently with addition of acid, the binding ability of the chelating agent is reduced, so that other metal ions or hydrogen ions may displace the already bound alkaline earth metal. If certain anions that form very insoluble alkaline earth metals are present in the solvent solution after the pH is lowered, then alkaline earth metals may be displaced from the chelating agent and precipitated. Thus, if the pH is reduced with a sufficient quantity of a mineral acid such as phosphoric acid or sulfuric acid, which forms an insoluble salt with the alkaline earth metal ions, substantially all of the barium and other alkaline earth metals will be precipitated out as an insoluble salt such as phosphate or sulfate. If the pH is reduced with a mineral acid such as nitric acid or hydrochloric acid the released alkaline earth metal ions react with residual sulfate ions originally present in the scale dissolved in the solvent to form an insoluble alkaline earth metal sulfate. The use of nitric acid or hydrochloric acid, is therefore preferred because these acids enable residual sulfate ions present in the solvent to be removed as insoluble precipitate formed with the alkaline earth metal cations. Removal of the residual sulfate ions from the solvent is beneficial because these ions are known to inhibit dissolution of alkaline earth sulfate scale by the solvent after the solvent is regenerated for reuse. Anions as sulfate or phosphate in solution at the time of lowering the pH are suitable for forming precipitates with the released metal ions. The following equations illustration precipitation of barium ions using phosphoric, nitric and sulfuric acid:

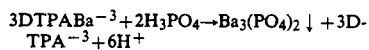

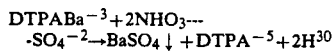

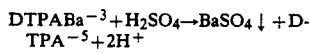

The amount of acid used is selected to reduce the pH of the solvent to a value of about 4 to 9, preferably 5 to 7. The amount of the precipitate-forming anion which is required will depend upon the concentration of the scale-forming metal (Ba, Ca, Sr) in the solvent. Sufficient precipitate forming anion should be added to ensure that the solubility product of the insoluble species is exceeded and that substantially all of the alkaline earth cations are removed as insoluble precipitate. Since many alkaline earth salts have low solubility products, it is simple to select anions which, under the pH conditions employed, form precipitates with the alkaline earth cations. When the acid itself provides the precipitating cations e.g. phosphoric acid or sulfuric acid, the anions will readily be available in sufficient quantity but if the acid is one which forms soluble alkaline earth salts, care should be taken to ensure that a sufficient quantity of the precipitant anion is used to remove the scale-forming metal.

The solvent is separated from the barium sulfate precipitate by centrifugation, decantation, or filtration. The pH of the solvent is then increased to a pH of about 10 to about 14, preferably 12, by the addition of potassium hydroxide to recover a regenerated solvent for reuse to dissolve scale.

The following examples show the method of regenerating scale solvents through precipitation of the dissolved metal ions and subsequent upward adjustment of pH.

EXAMPLES

Regeneration of Scale Solvent using pH Adjustments

A sample of spent scale solvent containing dissolved barium sulfate was titrated with concentrated hydrochloric acid (36%, 22° Baume) until the pH of the solvent was reduced from 12 to 7 in one example and from 12 to 6 in another example. Concentrated nitric acid could also be used to acidify the solvent, but there is some danger with nitric acid since it is an oxidizing agent. At a reduced pH of 7 or 6, a precipitate of barium sulfate was formed when the chelating agent (DTPA) was destabilized by reacting with hydrogen ions and releasing barium ions which react residual sulfate ions to form an insoluble barium sulfate salt. These ions, in addition to strontium, and calcium, are found in oilfield scales and could be readily dissolved by the scale solvent. The residual sulfate ions present in the spent solvent are therefore used to advantage to remove the released barium ions as a sulfate precipitate and reduce sulfate concentration in the solvent. Since sulfate ions must be removed in order to further dissolve more alkaline earth sulfate scales, because of the common ion effect, this step has a dual purpose removal of both objectionable cation and anion.

In the second step of the process, the barium sulfate precipitate was removed from the solvent by centrifuging, filtering or decanting the solvent from the precipitate.

In the third step of the process, the pH of the solvent was re-adjusted to 12 with the addition of solid potassium hydroxide (caustic potash) to produce a fully regenerated solvent.

Both examples of this procedure are shown in FIGS. 1 and 2. In both Figures, three cycles of regeneration are illustrated. Cycle zero is the initial amount of barium sulfate dissolved in fresh solvent (51.3 g/l). Cycle #1 is the result of one pH adjustment, precipitation, and re-adjustment of pH. In FIG. 1, for a pH reduction to 6, a least square line was drawn through the amount of barium sulfate recovered in each cycle and was extrapolated through 10 cycles. The second line was extrapolated to 10 cycles for cumulative barium sulfate dissolved using the right most Y axis. After three cycles, about four times the initial amount of scale is dissolved using this regeneration scheme. FIG. 2 is very similar to FIG. 1, except the amounts of scale dissolved are slightly lower due to the pH reduction not being as low as in FIG. 1. It was determined independently of these results that neither the chelating agent (DTPA) nor the synergist (Oxalate) are precipitated during the pH lowering processes. Based on bulk chemical prices (Chemical Marketing, Aug. 20, 1990), the regeneration process is an economical alternative to makeup of fresh scale solvent since the cost of regeneration is only a small fraction of the cost of fresh scale solvent.

What is claimed is:

1. In the method for removing alkaline earth sulfate scale by contacting the scale with an aqueous solvent having a pH of about 10 to about 14 and comprising a chelating agent comprising a polyaminopolycarboxylic acid or salt of such an acid, and a synergist anion; the improvement comprising removing alkaline earth sulfate scale dissolved in said solvent by:
(a) acidifying said solvent in the presence of an anion which forms a precipitate of an insoluble salt of the alkaline earth metal of the dissolved scale, and
(b) separating the precipitate from the solvent and increasing the pH of the solvent to a pH of about 10 to about 14 to recover a regenerated solvent.

2. A method according to claim 1 wherein the chelating agent comprises DTPA.

3. A method according to claim 1 wherein the chelating agent comprises EDTA.

4. A method according to claim 1 wherein the scale comprise barium, strontium or calcium sulfate and mixtures thereof and naturally occurring radioactive material (NORM), mainly radium 226 and radium 228.

5. A method according to claim 1 wherein the synergist comprises a monocarboxylic acid.

6. A method according to claim 5 in which the monocarboxylic acid is salicylic acid or a substituted acetic acid.

7. A method according to claim 1 wherein the synergist is oxalate.

8. A method according to claim 1 in which the solvent is acidified with an acid having anions which form an insoluble precipitate with the alkaline earth metal of the dissolved scale.

9. A method according to claim 8 in which the acid is sulfuric acid or phosphoric acid.

10. A method according to claim 1 in which the pH of the solvent containing the dissolved scale is step (a) is reduced to a value of 5 to 7 by the acidification.

11. A method according to claim 1 in which the pH of the solvent in step (b) is increased by the addition of potassium hydroxide.

12. A method according to claim 1 in which the solvent is acidified with nitric acid or hydrochloric acid.

* * * * *